Patented Sept. 9, 1924.

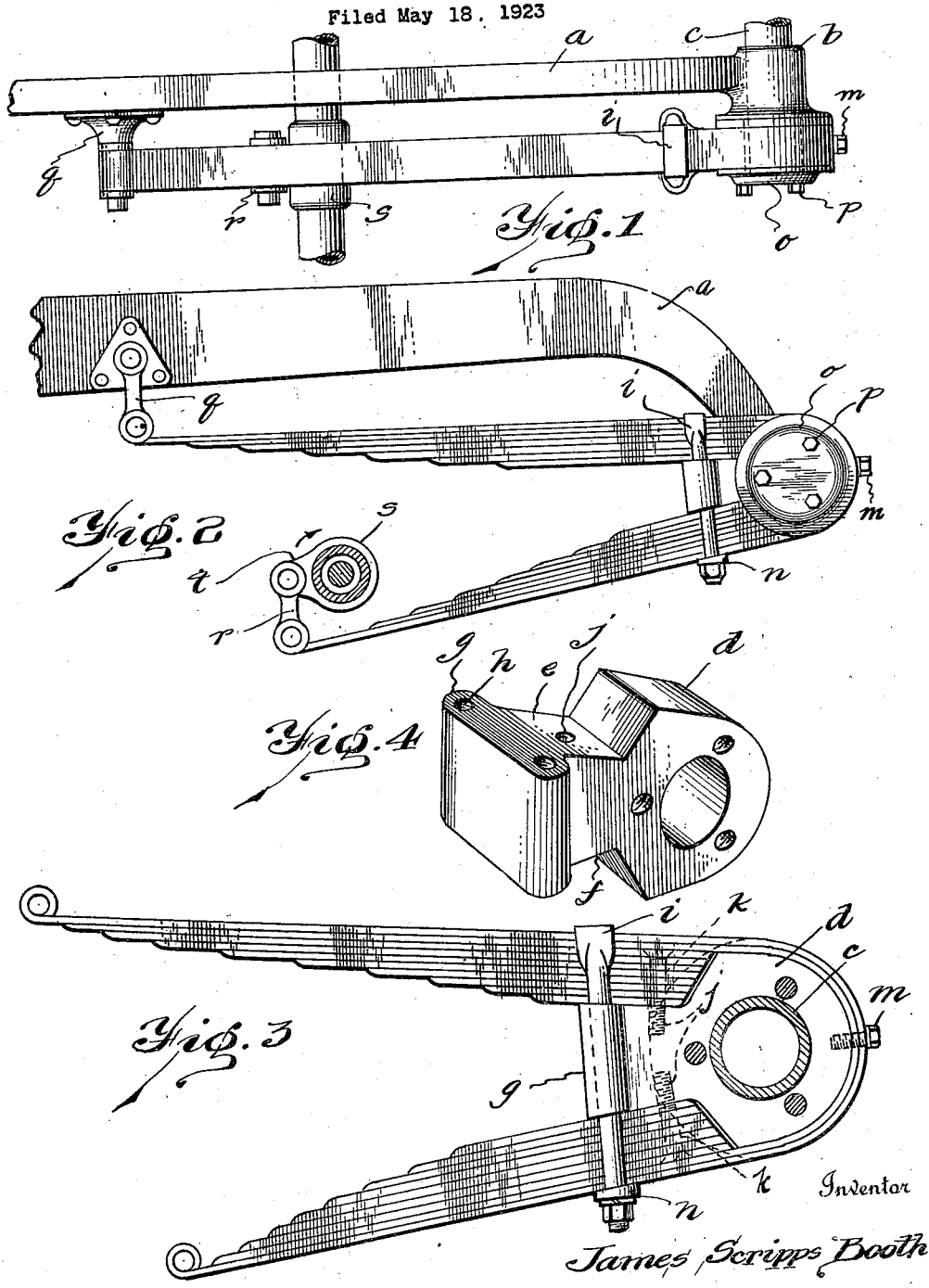

1,508,157

UNITED STATES PATENT OFFICE.

JAMES SCRIPPS BOOTH, OF DETROIT, MICHIGAN.

SPRING SUSPENSION FOR VEHICLES.

Application filed May 18, 1923. Serial No. 639,934.

*To all whom it may concern:*

Be it known that JAMES SCRIPPS BOOTH, citizen of the United States, residing at Detroit, in the county of Wayne and State of Michigan, has invented certain new and useful Improvements in Spring Suspensions for Vehicles, of which the following is a specification.

This invention relates to spring suspension of vehicle bodies and chassis frames and especially the spring suspension at the rear axle of a motor vehicle. The object of the present invention is to provide an improved spring suspension of a hairpin cantilever type. This type of spring suspension is not broadly new but I believe that the structure involved in the formation of the spring and the spring perch is new, and has decided advantages in securing an easier assembly, a better anchorage, and a better spring action.

Furthermore, I employ a connection for the lower leg of the spring with the axle that is arranged to resist the torque imparted to the axle when the clutch is slipped in. This connection is so designed as to give the lower leg of the spring a greater length and flexibility for the same length of wheel base and chassis frame.

These and other features will better appear when a detailed description of the invention is had.

In the drawings:

Fig. 1 is a fragmentary plan view of the rear end of the chassis frame and the spring.

Fig. 2 is a side elevation of the same.

Fig. 3 is a side elevation of the spring with the perch cap removed.

Fig. 4 is a perspective of the perch.

*a* represents the usual channel bar of the frame. This is provided at its rear end with a sleeve portion *b* to receive the cross rod *c* that connects the two rear ends of the chassis frame bars. This cross rod extends beyond the end of the chassis frame bar *a* and forms a bearing on which the perch hub *d* is arranged to turn. This perch hub *d* is a special casting or forging detailed in Fig. 4 and comprises a hub or sleeve portion and a sort of dovetail shaped anchor portion that forms the spring seats *e* and *f*. This will be termed in the claims the anchor portion. The casting is provided with a pair of laterally extended bosses on the anchor portion designated *g;* these have perforations *h* passing therethrough to receive the legs of the U bolt *i*.

The seats *e* and *f* are bored and tapped with screw holes *j* to receive the screws *k* which pass through openings in the inner leaves of the spring to anchor the said inner leaves against shifting or longitudinal movement. Two or more outer leaves of the spring preferably pass completely around the perch as shown in Fig. 3, concealing these screws. The cap screw *m* passing through these outer leaves anchors them to the perch so that they cannot shift thereon. U bolts *i* when drawn down against the springs and the cross bar *n* serve to clamp the spring leaves tightly to the perch. This forms a simple construction, easy of assembly and efficient. The perch together with the spring leaves can turn as a unit on the bearing formed by the end of the cross rod *c*. The cover plate *o* is adapted to be secured to the end of the hub by means of the cap screws *p*. This covers up the end of the cross rod and conceals certain of the retaining parts underneath.

The upper rod of the hairpin spring is longer than the lower leg and can be secured to the chassis frame at a point considerably in advance of the rear axle by means of the shackle *q*. The lower end of the hairpin spring is secured by a shackle *r* to the rear axle bracket *s*. This bracket is provided with a forwardly projecting extension *t* which carries the connection of the spring with the axle to a point somewhat in advance of the rear axle. This permits the use of a longer and more flexible lower leg for the spring than would be possible if the connection were at the rear or on the under side of the axle. This, of course, gives a better spring action for a given wheel base and given chassis frame length. Furthermore, when the clutch is let in, the action of the propeller shaft and the ring gear of the differential tends to cause the rear axle housing to turn in the direction of the arrow shown in Fig. 2. This torsional strain is resisted by the free end of the lower leg in my hair pin spring and inasmuch as the turning stress is applied to the spring at right angles to the length of the spring, it will be apparent that the spring may easily flex under this stress and very easily absorb the torque of the rear axle housing thereby easing up the strains on the parts and relieving the car from any objectionable jar or vibration.

From this description it will be apparent that the spring in its general configuration is similar to a hairpin so I call it a hairpin spring or V spring. On the other hand, the spring turns at its apex on a bearing so that it is essentially a cantilever type.

What I claim is:

1. In a spring suspension for vehicles, the combination of a chassis frame, the combination of an axle housing, a V type of spring rotatably supported at its apex by the chassis frame and having its upper leg secured to the chassis frame and having its lower leg secured to the axle housing in advance thereof, whereby torsion on the axle housing tends also to rotate the spring at its apex.

2. In a spring suspension for vehicles, the combination of a chassis frame, an axle housing, a V type of spring rotatably secured to the chassis frame at its apex and at the rear of the axle housing, and having its upper leg secured to the chassis frame and having its lower leg secured to the axle housing in advance thereof and under the axle housing.

3. In a spring suspension, the combination of a chassis frame, an axle housing and a V type of spring rotatably secured to the chassis frame at its apex and having its upper leg secured to the chassis frame at the rear of the axle housing and the lower leg longer than the distance between the axis of rotation of the spring and the axis of the axle housing and secured to said axle housing under and in advance of the axle housing.

4. In a spring suspension, the combination of a chassis frame, an axle housing and a V type of spring rotatably secured to the chassis frame at its apex and at the rear of the axle housing and having its upper leg secured to the chassis frame and its lower leg shackled to the axle housing at a point in advance of the axle housing.

5. In a spring suspension for vehicles, the combination of a chassis frame, an axle housing, a V type of spring rotatably secured at the apex of the V to the chassis frame at the rear of the axle housing and having the upper leg of the V spring secured to the chassis frame, the lower leg of the V extended under and in advance of the axle housing, a bracket secured to the axle housing and having a forwardly projecting portion, and a shackle connecting the forward end of the spring with the forwardly projecting portion of the bracket.

6. In a spring suspension for vehicles, the combination of a chassis frame having a laterally projecting portion, and a V type of spring mounted on such projecting portion and including a spring perch in the form of a fixture having a sleeve portion and a projecting anchor portion some of the leaves of the spring ending at and resting on the seats formed by the anchor portion and one or more of the outside leaves of the spring extending around the outside of the sleeve portion.

7. In a spring suspension for vehicles, the combination of a chassis frame provided with a laterally projecting portion, a V type of spring mounted on said laterally projecting portion by a perch in the form of a fixture having a sleeve portion and a projecting anchor portion, the inner leaves of the V type of spring seating on opposite sides of the anchor portion and ending there, means for securing the leaves against shifting on the anchor portion, and separate means for binding the leaves to the anchor portion.

8. In a spring suspension for vehicles, the combination of a chassis frame provided with a laterally projecting portion, a V type of spring mounted on such projecting portion and including a spring perch in the form of a fixture having a sleeve portion and an anchor portion, the latter provided on opposite sides with spring seats some of the leaves of the spring ending at these seats and resting thereon, screws passing through said leaves and anchoring the leaves onto the seats against shifting, and means for further clamping the leaves to the seats.

9. In a spring suspension for vehicles, the combination of a chassis frame provided with a laterally projecting portion, a V type of spring mounted on such projecting portion by a perch having a sleeve portion adapted to fit over the projecting portion and an anchor portion provided on opposite sides with spring seats and having portions through which a U bolt can pass, the said V spring having leaves resting on said seats, and a U bolt passing through the said portions for clamping the leaves to the seats.

10. In a spring suspension for vehicles, the combination of a chassis frame provided with a laterally projecting portion, a V spring including a perch having a sleeve portion fitting on the laterally projecting portion and provided with an anchor portion having oppositely located spring seats and provided with bosses having openings therethrough, and a single U bolt for fitting around the leaves of the spring and through the openings of the bosses of the perch to clamp the leaves to the spring seats.

11. In a spring suspension for vehicles, the combination of a chassis frame, and a V type of spring including a perch in the form of a hub with a forwardly projecting anchor portion having a pair of spring seats that are each bored and tapped, the leaves of the spring being some of them seated on the said seats and terminating at the said seats and secured from shifting thereto by screws, the outer leaves of the spring extending over said screws and around the hub portion of the perch, and means for binding the leaves together.

12. In a spring suspension for vehicles the combination of a chassis frame provided with a laterally projecting bearing, a V type of spring provided with a perch having a hub portion mounted to turn on said bearing, said hub having integral therewith a forwardly extending anchor portion, the inner leaves of the spring terminating at the anchor portion and seated on opposite sides, the outer leaves running around the hub of the perch, and a U bolt passing through the perch and around the leaves for clamping the same to the anchor.

13. In a spring suspension for vehicles, the combination of a chassis frame provided with a laterally projecting bearing, a V type of cantilever spring rotatably secured on said bearing by a perch in the form of a hub and anchor, means for securing the spring leaves to the fixture so that it cannot be shifted, and separate means for clamping the spring leaves to the perch.

In testimony whereof he has affixed his signature.

JAMES SCRIPPS BOOTH.